US010790976B1

(12) United States Patent
Raevsky et al.

(10) Patent No.: US 10,790,976 B1
(45) Date of Patent: Sep. 29, 2020

(54) SYSTEM AND METHOD OF BLOCKCHAIN WALLET RECOVERY

(71) Applicant: BLOOMIO AG, Zug (CH)

(72) Inventors: Alexey Raevsky, Moscow (RU); Max Lyadvinsky, Moscow (RU)

(73) Assignee: BLOOMIO AG, Zug (CH)

( * ) Notice: Subject to any disclaimer, the term of this patent is extended or adjusted under 35 U.S.C. 154(b) by 226 days.

(21) Appl. No.: 16/051,571

(22) Filed: Aug. 1, 2018

(51) Int. Cl.
| | |
|---|---|
| *H04L 9/08* | (2006.01) |
| *H04L 9/32* | (2006.01) |
| *H04L 29/06* | (2006.01) |
| *G06Q 20/06* | (2012.01) |
| *G06Q 20/36* | (2012.01) |
| *G06Q 20/22* | (2012.01) |
| *H04W 4/14* | (2009.01) |

(52) U.S. Cl.
CPC ......... *H04L 9/0894* (2013.01); *G06Q 20/065* (2013.01); *G06Q 20/223* (2013.01); *G06Q 20/36* (2013.01); *H04L 9/0891* (2013.01); *H04L 9/3228* (2013.01); *H04L 9/3247* (2013.01); *H04L 63/08* (2013.01); *H04L 63/12* (2013.01); *H04L 2463/082* (2013.01); *H04W 4/14* (2013.01)

(58) Field of Classification Search
CPC ..... H04L 9/0894; H04L 63/12; H04L 9/3228; H04L 9/3247; H04L 63/08; H04L 9/0891; H04L 2463/082; G06Q 20/36; G06Q 20/065; G06Q 20/223; H04W 4/14
USPC .......................................................... 713/176
See application file for complete search history.

(56) References Cited

U.S. PATENT DOCUMENTS

| | | | | |
|---|---|---|---|---|
| 2018/0293557 | A1* | 10/2018 | Kim | G06Q 20/14 |
| 2019/0229926 | A1* | 7/2019 | Handa | H04L 9/3247 |

FOREIGN PATENT DOCUMENTS

WO   WO-2018200215 A1 *  11/2018   ............ H04L 29/08

* cited by examiner

*Primary Examiner* — Mohammad W Reza
(74) *Attorney, Agent, or Firm* — Arent Fox LLP; Michael Fainberg (57) ABSTRACT

Disclosed are systems and methods for recovering cryptocurrency assets which may be tied to a lost personal private encryption key. The disclosed system deploys a multi-signature wallet formed from a set of keys including the user's personal key, the key of an organization provides blockchain service for the user, and a reserve key stored by third-party escrow organization. To recover a lost user private key, the system generates and digitally signs with the appropriate private keys a blockchain transaction that includes a script configured, when executed by a node in a blockchain network, to replace the user key with a replacement key.

18 Claims, 6 Drawing Sheets

SYSTEM AND METHOD OF BLOCKCHAIN WALLET RECOVERY

FIELD OF TECHNOLOGY

The present disclosure relates generally to the field of cryptocurrencies and blockchain-based transactions, more specifically, to systems and methods for recovering cryptographic assets associated with a cryptocurrency wallet.

BACKGROUND

Cryptocurrency refers to a digital asset that uses cryptography to secure its assets, control the creation of additional assets (i.e., "mining"), and verify the transfer of assets. Blockchain technology is an emerging technology that has been used in cryptocurrency implementations. The blockchain is a data structure that stores a list of transactions and can be thought of as a distributed electronic ledger that records transactions between a source and a destination. The transactions are batched together into blocks and every block refers back to or is linked to a prior block in the chain. Computer nodes, sometimes referred to as miners, maintain the blockchain and cryptographically validate each new block (and the transactions contained therein) using a proof-of-work (or other) system.

One drawback to cryptocurrencies is the problem of unauthorized use of private encryption keys by a service provider. Cryptocurrency service providers, such as cryptocurrency exchanges, online wallet providers, etc., hold private keys of their customers and signs transactions for the blockchain on their behalf. However, such approaches may result in serious financial risk in cases of authentication breaches (e.g., when a malicious user succeeds in impersonating as an authorized user) or in cases of intentional or negligent misuse of clients' encryption keys (e.g., embezzlement, poor security practices by the service provider). Another drawback to cryptocurrencies is the level of risk related to maintaining possession of one's personal private key, which is used for signing spending transactions. That is, if a user loses possession of their personal private key for a cryptocurrency wallet (e.g., accidental deletion, malicious software, etc.), then the user loses all cryptocurrency assets that are attributed to that wallet. As such, there is a need for an improvement to the technologies related to cryptographic assets.

SUMMARY

Thus, a system and method is disclosed herein for managing blockchain-based transactions, and, more particularly, for managing private encryption keys associated with a cryptocurrency wallet. The described system addresses the technical problem of losing personal private keys of a blockchain user. The described system deploys a multi-signature wallet, where one private key is stored by a user as their personal key, a second key is stored by a service provider, and a third key is a reserve key stored by a third-party escrow organization. The multi-signature wallet may be configured using an M-of-N scheme, such as 2-of-3, where any two out of the three total keys may be used for managing the wallet. To recover a wallet despite a lost personal key, the user may send requests to both the service provider and the key escrow organization. In both organizations, the user undergoes an authentication process to the respective organization. After successful authentication, a "replace-key" transaction is created and signed by the service provider, co-signed by the key escrow organization, and sent to the blockchain network.

According to one aspect, a computer-implemented method is provided for recovering a cryptocurrency wallet. The method includes receiving, by a first computing device associated with a cryptocurrency service provider, a request to recover cryptographic assets attributed to a multi-signature wallet. The multi-signature wallet is associated with a set of encryption keys comprising a user key, a provider private key, and a reserve private key. The method further includes generating a blockchain transaction data structure for the multi-signature wallet. The blockchain transaction data structure includes a script configured, when executed by a node in a blockchain network, to replace the user key with a replacement key. The method includes generating a first digital signature based on the blockchain transaction data structure using a provider private key, wherein the provider private key is stored at the first computing device and is associated with the multi-signature wallet, and receiving, from a second computing device associated with a key escrow organization, a second digital signature generated based on the blockchain transaction data structure using a reserve private key, wherein the reserve private key is stored at the second computing device and is associated with the multi-signature wallet. The method further includes transmitting the blockchain transaction data structure that includes the first digital signature and the second digital signature to the blockchain network for validation.

In another aspect, the method further includes, responsive to receiving the request to recover the cryptographic assets attributed to the multi-signature wallet, authenticating a user using a multi-factor authentication technique.

In another aspect, the multi-signature wallet is configured using an M-of-N scheme, wherein actions related to the multi-signature wallet are authorized using at least two of: the provider private key, the reserve private key, and the user private key.

In another aspect, the method further includes receiving, from a user device operated by the user, a replacement public key to be associated with the multi-signature wallet; and modifying the blockchain transaction data structure to include at least one of a copy of the replacement public key, and a value derived from the replacement public key.

In another aspect, the script of the blockchain data structure comprises executable code configured to: verify the blockchain transaction data structure has been signed by at least the provider private key and the reserve private key; and responsive to verifying the blockchain transaction data structure has been signed, remove an association of the user key with the multi-signature wallet and add an association of the replacement key with the multi-signature wallet.

In another aspect, the method further includes, transmitting, to a user device, a one-time password in response to the recovery request, wherein the one-time password is transmitted by the first computing device as a text message via a short message service (SMS).

According to another aspect of the present disclosure, a system for recovering a cryptocurrency wallet is provided. The system includes a memory device configured to store a provider private key, and a hardware processor. The hardware processor is configured to receive a request to recover cryptographic assets attributed to a multi-signature wallet, wherein the multi-signature wallet is associated with a set of encryption keys comprising a user key, a provider private key, and a reserve private key, and generate a blockchain transaction data structure for the multi-signature wallet. The blockchain transaction data structure includes a script configured, when executed by a node in a blockchain network, to replace the user key with a replacement key. The processor is further configured to generate a first digital signature based on the blockchain transaction data structure using the provider private key associated with the multi-signature wallet, and receive, from a second computing device associated with a key escrow organization, a second digital signature generated based on the blockchain transaction data structure using a reserve private key, wherein the reserve private key is stored at the second computing device and is associated with the multi-signature wallet. The processor is further configured to transmit the blockchain transaction data structure that includes the first digital signature and the second digital signature to the blockchain network for validation.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for executing a blockchain-based transaction. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
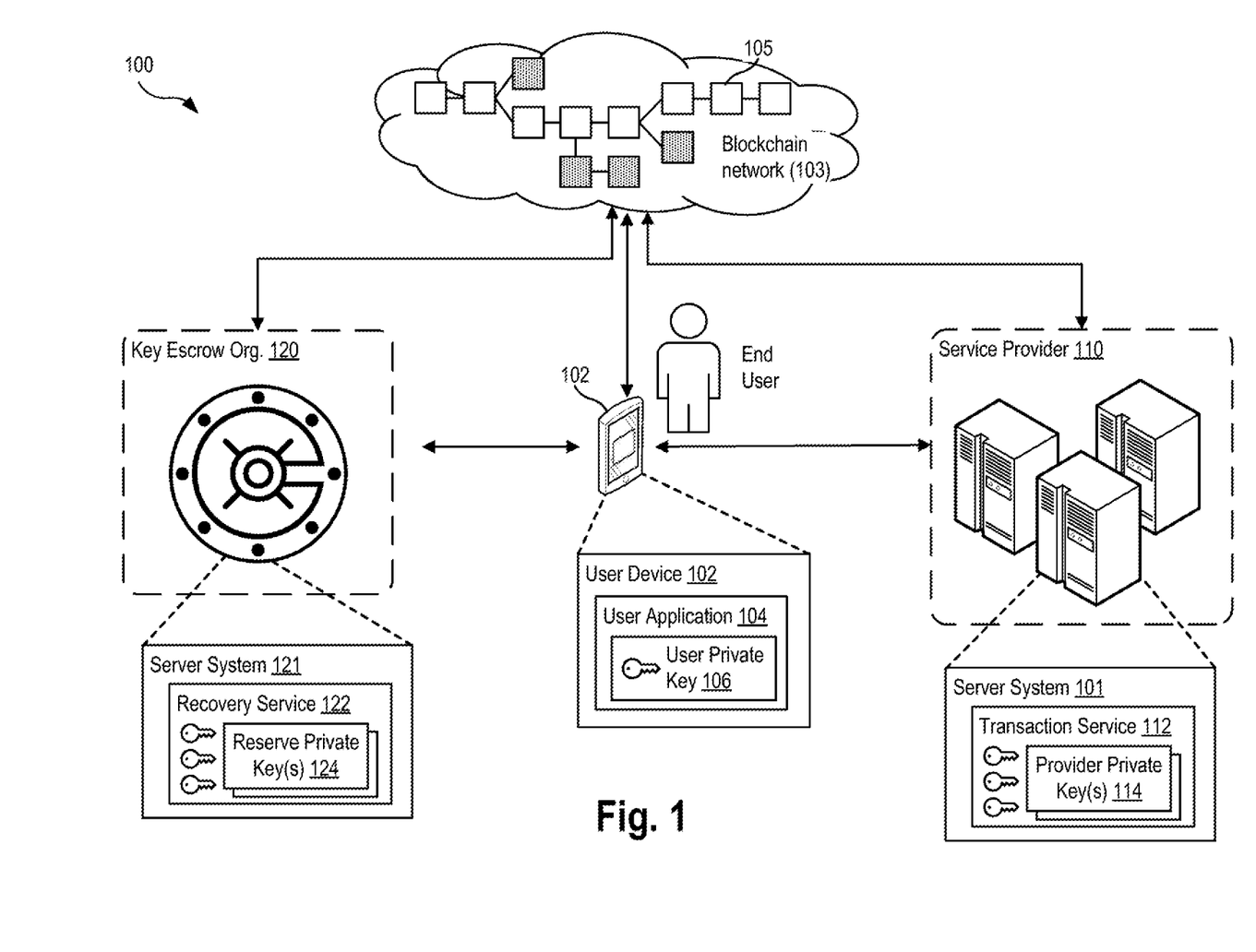
FIG. 1 is a block diagram of a system for executing a blockchain-based transaction, according to an exemplary aspect.

FIG. 1 is a block diagram of a system 100 for executing blockchain-based transactions, according to an exemplary aspect. The system 100 may include a user device 102, one or more server systems 101 managed by a service provider 110, one or more server systems 121 managed by a key escrow organization 120, and a blockchain network 103. The user device 102 may be one of personal computers, servers, laptops, tables, mobile devices, smart phones, cellular devices, portable gaming devices, media players or any other suitable devices that can retain, manipulate and transfer data.

The user device 102 may include a user application 104 configured to perform one or more cryptocurrency or blockchain-based transactions with the blockchain network 103 in coordination with a transaction service 112 executing in the server system 101. In some aspects, the user application 104 may be a wallet application configured to manage one or more private keys, generate a plurality of transaction data structures, and generate cryptocurrency addresses to be used for transactions, and other related functionality.

According to an exemplary aspect, the blockchain network 103 can be an existing (public or private) distributed network formed from a plurality of peer-to-peer nodes or computers. According to aspects, the blockchain network 103 maintains a blockchain 105, which is a continuously-growing list of data records hardened against tampering and revision and is composed of data structure blocks that hold the data received from other nodes or client nodes, including the user device 102 and server systems 101. The user device 102 may transmit data values to the blockchain network 103 as a transaction data structure, and the nodes in the blockchain network records and confirms when and in what sequence the data transactions enter and are logged in the existing blockchain 105. Every node in the decentralized system can have a copy of the growing blockchain 105, avoiding the need to have a centralized ledger managed by a trusted third party. Moreover, each of the nodes can validate the data, add hash values to their copy of the blockchain 105, and then broadcast these additions to other nodes in accordance with existing blockchain methodologies.

Cryptographic assets (also referred to as crypto assets) refer to a technology of digital assets that are managed using cryptographic techniques, for example, to secure the transactions of, control the creation of, and verify the transfer of such assets. Examples of crypto assets may include cryptographic currency ("cryptocurrency assets"), utility tokens (e.g., app coins, user tokens), security tokens, or other similar assets. For sake of discussion, aspects of the present disclosure may be discussed in relation to cryptocurrency assets, but it is understood that aspects may be extended to apply to other types of crypto assets described herein.

A "wallet" as used herein may refer to a user account to which cryptographic assets are attributed, and which may be managed by the user application 104 and/or the transaction service 112. The software application or client used to manage the cryptocurrency wallet is sometimes interchangeably referred to as the wallet. The user application 104 and the transaction service 112 may be configured to manage a user's wallet by maintaining private and public encryption key pairs tied to the cryptocurrency assets, and create and sign blockchain transactions involving the cryptocurrency assets using those encryption keys. A traditional cryptocurrency wallet can be defined by a single private encryption key. That is, the holder of the private key is able to sign transactions to spend cryptocurrency from the wallet, which are then put into force by being recorded in a blockchain network.

According to an aspect, the user application 104 and the transaction service 112 may be configured to maintain a multi-signature wallet which is defined by multiple private encryption keys. Transactions involving the multi-signature wallet are required to be signed by the multiple private keys to be accepted. In an aspect, the multi-signature wallet may be defined by a set of three private encryption keys for a user: a "user" private key 106, a "provider" private key 114, and a "reserve" private key 124. The user private key 106 may be stored by the user/customer (e.g., at the user device 102); the provider private key 114 may be stored separately by the service provider (e.g., at the server system 121); and the reserve private key 124 may be stored by the key escrow organization 120. The service provider 110 may store separate private keys 114 for each user of the service 112, and similarly, the key escrow organization 120 may store separate reserve keys 124 for each user of the key escrow organization. In an aspect, the multi-signature wallet is configured using an M-of-N scheme such that, out of a total of N keys, a minimum of M keys is required to authorize a transaction with the wallet. For example, transactions related to the multi-signature wallet are authorized using at least two of the user private key 106, the provider private key 114, and the reserve private key 124. Accordingly, rather than use a form of secret sharing, such as Shamir's secret sharing scheme that distributes parts of a divided key to different entities, aspects of the present disclosure provide multiple separate private keys created for a wallet (e.g., 2-of-3 MULTI-SIG) of which at least two are required for signing the transaction.

Multi-Signature Wallet Transaction

Figure 2:
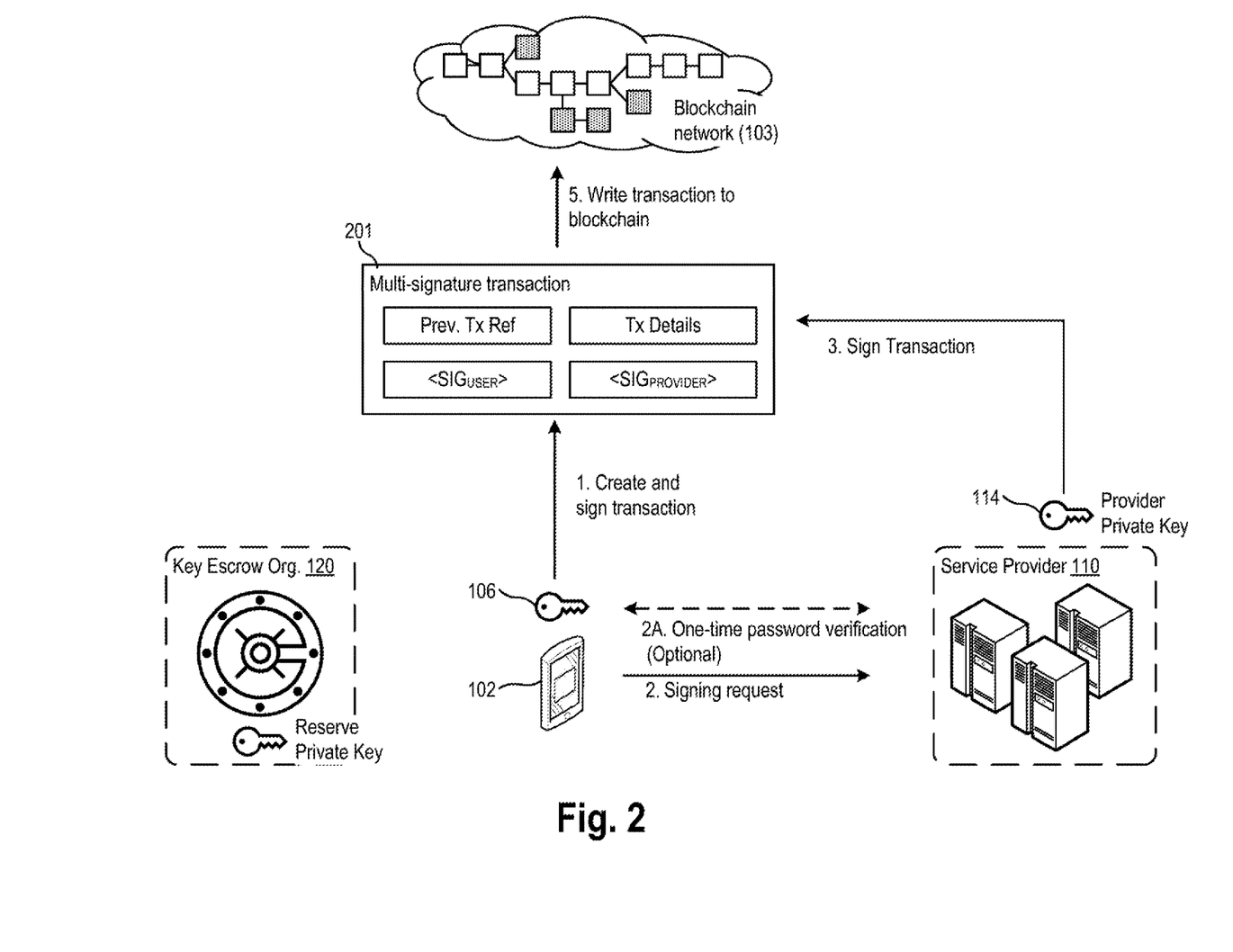
FIG. 2 is a block diagram of operations for executing a blockchain-based transaction using a multi-signature wallet, according to an exemplary aspect.

FIG. 2 is a block diagram of operations for executing a blockchain-based transaction using a multi-signature wallet, according to an exemplary aspect. Example operations may be described in the context of the system 100 shown in FIG. 1. To execute a transaction, the user creates a transaction and signs it with their private key. The user may then log into the service provider and request for signature of this transaction. The service provider may optionally request additional authentication, for example, by sending to the customer a one-time password via SMS text message, and the customer enters this one-time password to confirm their identity. If successful, the service provider signs the transaction using its private key, and the transaction is sent to the blockchain network.

According to one aspect, the user application 104 may be configured to (e.g., in response to user input) generate a transaction data structure 201 associated with the cryptographic wallet (i.e., a first user account) and indicating output to a recipient (i.e., a second user account). In some aspects, the transaction data structure 201 may indicate one or more amounts of assets (e.g., 0.05 Bitcoin, or BTC) that represent the output of the transaction data structure 201. The transaction data structure 201 may include a reference to a prior transaction data structure. For example, in the case of a cryptocurrency transaction, the reference to a prior transaction data structure may be the transaction identifier of the prior cryptocurrency transaction from which the assets of the current transaction are drawn (e.g., Input). In some aspects, the transaction identifier may simply be a hash value of the data values in a single transaction data structure (e.g. in a serialized binary form).

In one aspect, the user application 104 may generate a first digital signature based on the data values of the transaction data structure using the user private key 106. In some aspects, the digital signature may be an encryption of the transaction hash calculated using the user private key 106. The digital signature created using the user private key 106 is depicted as $<SIG_{USER}>$ in FIG. 2. To obtain another digital signature as required for the multi-signature wallet, the user application 104 may transmit, to the service provider 110, a signing request associated with the transaction data structure 201 that causes, in all, the service provider 110 to generate a second digital signature based on the transaction data structure using the user's other private key stored at the provider (i.e., provider private key 114). This second digital signature created using the provider private key 114 is depicted as $<SIG_{PROVIDER}>$ in FIG. 2. In some aspects, digital signatures may be generated based on elliptic curve cryptography, such as the Elliptic Curve Digital Signature Algorithm (ECDSA), or other forms of cryptographic algorithms such as the Digital Signature Algorithm (DSA).

Optionally, the co-signing of the transaction data structure 201 may be performed depending on additional authentication mechanisms between the service provider 110 and the user, such as through use of a one-time password or multi-factor authentication. In one example, the user may successfully log into the service provider 110 and request the service provider 110 sign this transaction (i.e., transmit a signing request associated with the transaction data structure 201). In response, the transaction service 112 may generate and transmit, to the user device 102 (or another user device), a one-time password associated with the signing request of the transaction data structure 201. In some aspects, the one-time password is transmitted as a text message via a short message service (SMS) to a telephone number associated with the user account (e.g., the telephone number of the user device 102 in aspects where the user device is a smartphone). In some aspects, the one-time password may be generated by the user device using a keyed-hash message authentication code (HMAC)-based or time-based password generator associated with the first user account. In some aspects, the one-time password may be time-restricted, i.e., valid for a limited period of time. The user device 102 receives the one-time password, and the user may enter the one-time password to confirm their identity and authorize the multi-signature transaction. In some aspects, the user may enter the one-time password within the communication session established between the transaction service 112 and the user device 102.

In one aspect, after the transaction is signed using two of the private keys, the user application 104 may transmit the transaction data structure 201 to the blockchain network 103. As shown in FIG. 1, the transaction data structure 201 may include both the first digital signature (e.g., "$<SIG_{USER}>$") and the second digital signature (e.g., "$<SIG_{PROVIDER}>$"). As described earlier, the transaction data structure 201 may be recorded into the growing distributed ledger in the blockchain network 103. It is noted that the reserve private key 124 and the key escrow organization 120 might not be involved in this workflow.

Multi-Signature Wallet Recovery

Figure 3:
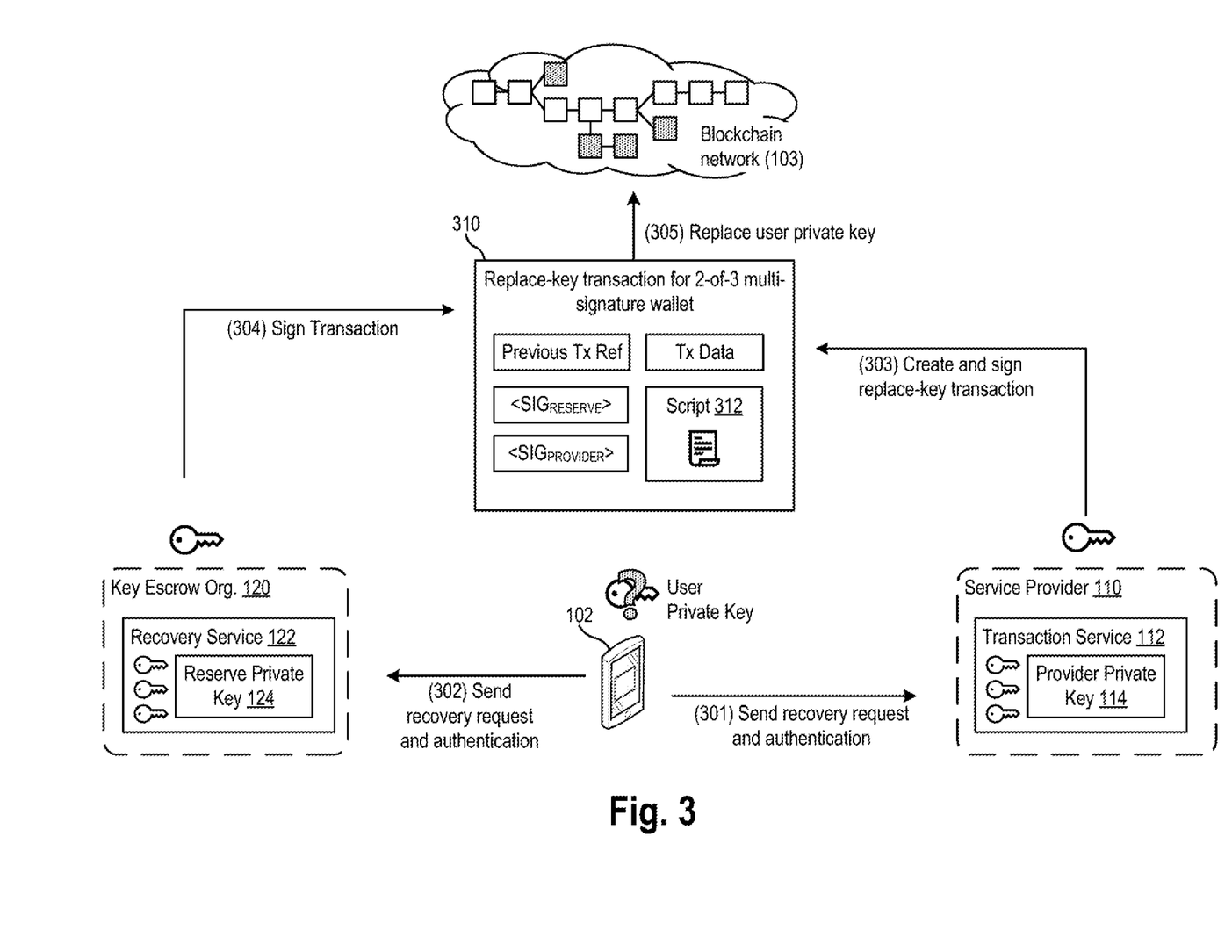
FIG. 3 is a block diagram of operations for recovering a multi-signature wallet, according to an exemplary aspect.

FIG. 3 is a block diagram of operations for recovering a multi-signature wallet, according to an exemplary aspect. Example operations may be described in the context of the system 100 shown in FIG. 1. In this example, the user has lost access to their private key 106, which may occur through accidental data loss, data corruption, loss of the user device 102 itself on which the private key is stored, or through actions of malicious applications (e.g., malware). As such, without further recourse, the user may be unable to perform or authorize any more transactions involving assets in their cryptocurrency wallet because the provider private key 114 is insufficient by itself to perform transactions of the (multi-signature) wallet.

To initiate recovery of the cryptocurrency wallet, the user may send a recovery request to both the service provider 110 (operation 301) and to the key escrow organization 120 (operation 302). In both interactions, the user undergoes an authentication process with the respective service. From the perspective of the service provider 110, the transaction service 112 may be configured to receive a request to recover cryptographic currency assets attributed to the multi-signature wallet.

In one aspect, the user application 104 may establish a communication session with a transaction service 112 of the service provider 110 using user credentials associated with the user's account. In some aspects, the user application 104 may provide a log-in screen to a user of the user device, which is configured to receive credentials, such as a username and password, and logs into the service provider 110. In other aspects, the user application 104 may direct the user to a web browser (not shown) executing on the user device 102 to access a web site or web application provided by the transaction service 112. In other aspects, the user application 104 may direct the user to another application installed on the user device 102 that is provided by the transaction service 112 for authentication purposes.

In some aspects, the transaction service 112 may generate and transmit, to the user device 102, a one-time password associated with the recovery request (similar to the one-time password workflow described earlier). In some aspects, the one-time password is transmitted as a text message via a short message service (SMS) to a telephone number associated with the user account (e.g., the telephone number of the user device 102 in aspects where the user device is a smartphone.) Other authentication processes may be used, including an email-based authentication workflow in which a unique identifier or URL is emailed to an email account associated with the cryptographic wallet, which when activated by the user, causes the transaction service to authenticate the user; a process of photo ID card demonstration to a representative of the service provider; an authenticator application executing on the user device 102 having a software token that represents the possession factor in a multi-factor authentication scheme; and a hardware token stored on a dedicated hardware device (e.g., RSA token).

In one aspect, the user application 104 may also establish a second communication session with a recovery service 122 of the key escrow organization 120, and send over a corresponding request to recover cryptographic currency assets attributed to the multi-signature wallet (operation 302). The techniques for authenticating with the key escrow organization 120 may be similar to the authentication techniques used with the service provider 110. The user application 104 may provide the recovery service 122 with an indication (e.g., ticket identifier, single-sign on) used to link together the recovery service 122 and the transaction service 112 such that both services may coordinate a co-signing of the replace-key transaction data structure 310.

In an aspect, the user application 104 may be configured to generate a replacement user encryption key, including a private-public key pair (i.e., a replacement user private key and a replacement user public key) to be associated with the multi-signature wallet. The user application 104 may transmit a copy of the replacement user public key, or a value derived from the replacement user public key (e.g., a truncation or a hash of the public key) to the transaction service 112 (or in other aspects, the recovery service 122) as part of the recovery request.

In response to successful authentication, the transaction service 112 may be configured to generate a blockchain transaction data structure 310 for recovery of the multi-signature wallet (operation 303). In an aspect, the blockchain transaction data structure may indicate a "replace key" transaction for the multi-signature wallet. The replace-key transaction may be implemented by a script 312 configured to, when executed by a node in the blockchain network 103, replace the user key with a replacement key. In some aspects, the script 312 may remove an association of the user private key 106 with the multi-signature wallet, and add an association of the replacement private key. The script 312 may incorporate a copy of the replacement public key (or value derived therefrom) which was received as part of the recovery request. The script 312 may use the value of the replacement public key (or its derived value) as an input parameter to a replace key operation. For simplicity of explanation, it is assumed that discussion of the use of the public key may be extended to use of derived versions of the public key, such as hashes, truncations, or other transformations of the public key value. Details of the script 312 are described later.

The transaction service 112 may be further configured to generate a first digital signature (e.g., $<SIG_{PROVIDER}>$) based on the blockchain transaction data structure (i.e., signs the transaction) using the provider private key 114 which is part of the set of private encryption keys for the multi-signature wallet. This digital signature may encode certain transaction data (e.g., transaction identifier and output identifier of a previous transaction attributable to the wallet) and be inserted into one of the fields of the blockchain transaction data structure itself. In an aspect, the digital signature may be a cryptographic hash of data values in the transaction data structure 310 generated using elliptic curve cryptography, such as the Elliptic Curve Digital Signature Algorithm (ECDSA), or other forms of cryptographic algorithms such as the Digital Signature Algorithm (DSA).

The recovery service 122 may be configured to generate a second digital signature (e.g., $<SIG_{RESERVE}>$) using based on the replace-key transaction data structure 310 using the reserve private key 124, which is also part of the set of private encryption keys for the multi-signature wallet (operation 304). In one aspect, the signing of the replace-key transaction data structure 310 may be performed based on user input received within the communication session established between the user application 104 and the recovery service 122.

The transaction service 112 may receive, from the key escrow organization 120, the second digital signature generated based on the blockchain transaction data structure using the reserve private key 126. The transaction service 112 may incorporate the second digital signature into the blockchain transaction data structure for the replace-key transaction, and transmit the finished blockchain transaction data structure 310 to the blockchain network 103 for validation.

In a first approach, the replace-key transaction may be implemented using one or more function calls executed within a "smart contract" (script 312) that is embedded in the transaction data structure 310 itself. The script 312 may contain executable code which is configured to, when deployed on and executed by a node in the blockchain network 103, check that the transaction is signed by a required number of signatures (e.g., two out of three keys), and then replace at least one of the private keys (e.g., the third key) that defines the multi-signature wallet. Example pseudocode for performing a replace-key operation within the blockchain is provided below in Listing 1.

```
contract MultiSigWallet {
  mapping (address=>key) owners;
  function MultiSigWallet(key[ ] newOwners) { . . . }
  function replaceKey(firstKey, secondKey, oldKey,
     newKey) {
    if (!verifyMultiSigTransaction(firstKey, secondKey))
       return;
    removeOwner(oldKey);
    addOwner(newKey);
  }
  function verifyMultiSigTransaction(firstKey, secondKey)
     returns (bool)
  { . . . }
}
```

Listing 1: Example Pseudocode for Replace-Key Smart Contract

In one aspect, the smart contract (e.g., "MultiSigWallet") may include internal, dedicated storage used by the smart contract to store state. This storage may be organized as a "map" data structure or associative array. As shown in Listing 1, the smart contract may include a map data structure configured to store a plurality of public keys associated user key, the provider key, and the reserve key (i.e., "mapping (address=>key) owners"). In one implementation, the smart contract uses the owners map data structure to verify a multi-signature transaction (e.g., verifyMultiSigTransaction), for example, by checking whether the minimum number of input keys is found within the owners map data structure, or by using the owners map data structure to validate one or more input digital signatures created by input keys.

As shown in Listing 1, the replace key operation of the script 312 may be configured to use, as input parameters, the value of the replacement user public key ("newKey"), and the value of the lost user public key ("oldKey"). The replace key operation of the script 312 may include instructions ("removeOwner") to remove an association of the old user private key with the multi-signature wallet, followed by instructions ("addOwner") to add a new association of the replacement key with the multi-signature wallet. In one implementation, to remove an owner, the script 312 may be configured to check if the oldKey is in the map data structure, and if yes, remove it from there. In one implementation, to add a new owner, the script may check if the new owner is not already in the map, and if not, add the new owner to the owners map data structure.

Figure 4:
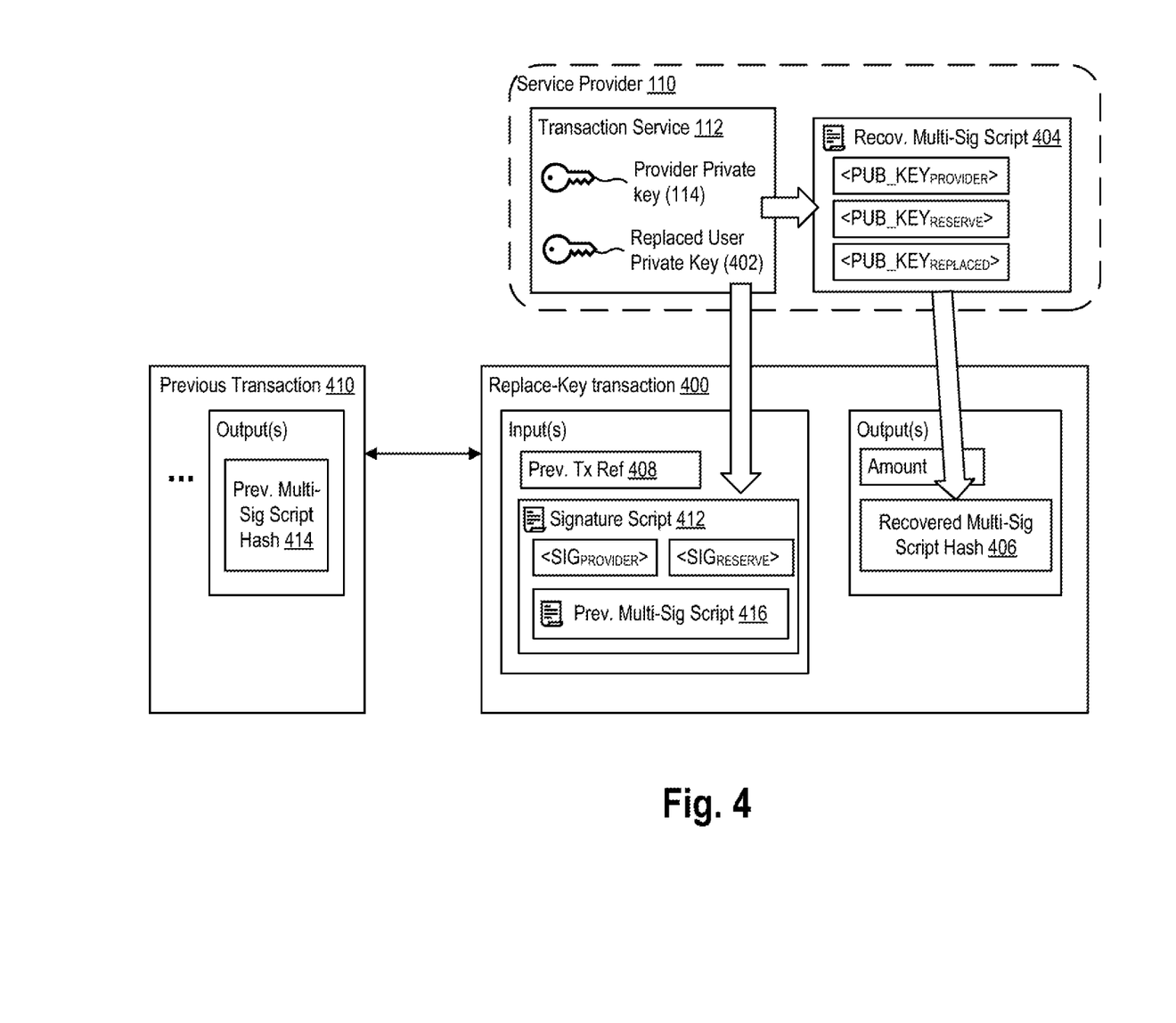
FIG. 4 is a block diagram of the replace-key blockchain transaction in greater detail.

In a second approach, shown in FIG. 4, the replace-key transaction may be implemented using a blockchain transaction 400 which sweeps cryptocurrency assets attributed to the multi-signature wallet to a wallet address formed set of the provider key, the reserve key, and a new user key.

The transaction service 112 may use the set of public keys corresponding to each of the provider private key 114, the reserve private key 124, and the replacement user private key 402 to form a recovered multi-signature script 404. The recovered multi-signature script 404 contains copies of the public keys corresponding to the provider private key 114, the reserve private key 124, and the replacement user private key 402 (e.g., <PUB_KEY$_{PROVIDER}$>, <PUB_KEY$_{RESERVE}$>, <PUB_KEY$_{REPLACED}$>). The recovered multi-signature script 404 also contains scripting code or other logic, which when executed, is configured to accept one or more signatures as input, and evaluate whether a required number of input signatures matches the public keys contained within the script 404, returning true or false as an output. The transaction service 112 may hash the script 404 to create a recovered multi-signature script hash 406. This script hash can act as the multi-signature wallet's new "address", which can function as a token (e.g., one-time use) used to designate a destination for the transfer of cryptocurrency assets from the previous wallet associated with the lost key. That is, to subsequently use cryptocurrency assets attributed to the multi-signature wallet, the transaction service 112 (or user device 102) provides a copy of the multi-signature script 404 matching the script hash 406 together with data (e.g., 2 out of 3 digital signatures) which causes the script to evaluate to true or return a "true" value. As shown, the script hash 406 is included as a parameter within the output field of the replace-key transaction 400.

The transaction service 112 may then generate an input portion of the replace-key transaction 400. The input portion may specifying one or more inputs, having a transaction identifier 408 that is a reference to a previous transaction 410 attributed to the cryptocurrency assets of the wallet with the lost user key. To use these assets from the lost wallet, the transaction service 112 generates a signature script 412 that contains the generated digital signatures made using the provider private key 114 and the reserve private key 124 (e.g., <SIG$_{PROVIDER}$>, <SIG$_{RESERVE}$>), and a copy of a previous multi-signature script 416 associated with the previous blockchain transaction 410. An example blockchain transaction is shown in object notation in Listing 2 below.

```
{
  txid: "0ac29fc675909eb565a0984fe . . . ",
    input: [{
      txid: "824a971c2a63445f7f91692 . . . ",
      scriptSig: {
        code:    "<SIG_PROVIDER><SIG_RESERVE>
          <PREV_MULTI_SIG_SCRIPT>",
        hex:
          "22223c3c73736969676720207070726f6f7 .
          . . "
  }],
  output: [{
    amount: 0.02015200,
    scriptPubKey: {
      code: "OP_HASH hash(<RECOVERED_MULTI-
        _SIG_SCRIPT>) OP_EQUAL",
      hex: " "
    }
  }
  time: 1404175879,
  blockhash: 00000000000000000002533a414a3ab5cb0e5d . .
  .
}
```

Listing 2: Example Replace-Key Transaction

It is understood that aspects of the present disclosure may be extended by omitting or re-arranging certain steps of the described workflow, or inserting other steps there between. For example, according to some aspects, the transaction service 112, rather than the user application 104, may handle contacting the recovery service 122 during the recovery process. In this aspect, the transaction service 112 may transmit, to the recovery service 122 of the key escrow organization 120, a request to generate the second digital signature based on the blockchain transaction data structure 310 using its reserve private key 126. In an aspect, the request between the transaction service 112 and the recovery service 122 may include one or more data values, such as a blockchain address, transaction identifiers, etc., of the replace-key transaction which are hashed using the reserve private key 126 to generate the second digital signature. In another variant aspect of the present disclosure, the recovery service 122 may be responsible for generating and signing the blockchain transaction data structure 310 for the replace-key transaction, getting the transaction service 112 to sign the transaction 310, and then transmit the replace-key transaction 310 to the blockchain network 103 for validation and recording (i.e., the recovery service 122 is the entity first creating the data structure 310).

Figure 5:
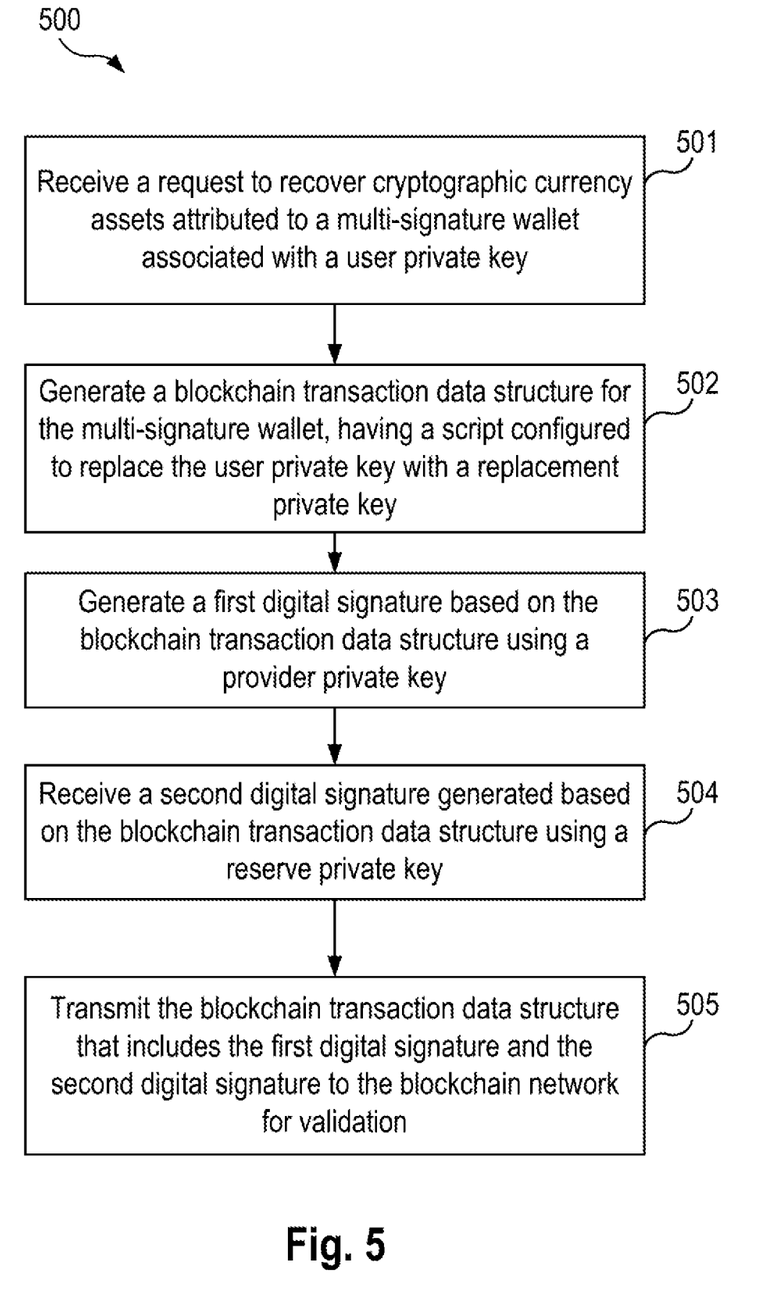
FIG. 5 is a flowchart of a method for executing a blockchain-based transaction according to an exemplary aspect.

FIG. 5 is a flowchart of a method 500 for executing a blockchain-based transaction according to an exemplary aspect. It is noted that the following description of the exemplary method makes reference to the system and components described above.

The method 500 begins at step 501, wherein a first computing device (e.g., server system 101) associated with a cryptocurrency service provider 110, receives a request to recover cryptographic assets attributed to a multi-signature wallet. The multi-signature wallet is associated with a set of encryption keys comprising a user private key 106 stored at a user device 102, a provider private key, and a reserve private key. For purposes of this disclosure, the multi-signature wallet is also considered associated with the corresponding user public key (paired with the user private key). In an aspect, the multi-signature wallet may be configured using an M-of-N scheme, wherein actions related to the multi-signature wallet are authorized using at least two of: the provider private key 114, the reserve private key 124, and the user private key 106.

In an aspect, responsive to receiving the request to recover cryptographic assets attributed to the multi-signature wallet, the transaction service 112 may authenticate a user using a multi-factor authentication technique. The transaction service 112 may provide the user device a one-time password in response to the recovery request, which may be received in return from the user device as an identity-verification indication. In some aspects, the one-time password is provided to the user device via a text message transmitted via a short message service (SMS).

At step 502, the first computing device (e.g., by execution of a transaction service 112) generates a blockchain transaction data structure for the multi-signature wallet. The blockchain transaction data structure may include a script 312 configured, when executed by a node in a blockchain network, to replace the user key with a replacement key. In some aspects, the script of the blockchain data structure includes executable code configured to (i) verify the blockchain transaction data structure has been signed by at least the provider private key and the reserve private key, (ii) responsive to verifying the blockchain transaction data structure has been signed, remove an association of the user key with the multi-signature wallet and add an association of the replacement key with the multi-signature wallet.

In some aspects, the transaction service 112 may receive from the user device 102 operated by the user, a replacement public key to be associated with the multi-signature wallet. The transaction service 112 may modify the blockchain transaction data structure to include at least one of a copy of the replacement public key, and a value derived from the replacement public key (e.g., hash, truncation).

At step 503, the first computing device (e.g., by execution of the transaction service 112) may generate a first digital signature based on the blockchain transaction data structure using a provider private key 114. The provider private key 114 may be stored at the first computing device and is associated with the multi-signature wallet. At step 504, the first computing device (e.g., by execution of the transaction service 112) may receive, from a second computing device (e.g., server system 121) associated with a key escrow organization 120, a second digital signature generated based on the blockchain transaction data structure using a reserve private key 124. The reserve private key 124 may be stored at the second computing device and is associated with the multi-signature wallet. At step 505, the first computing device (e.g., by execution of the transaction service 112) may transmit the blockchain transaction data structure that includes the first digital signature and the second digital signature to the blockchain network 103 for validation.

Figure 6:
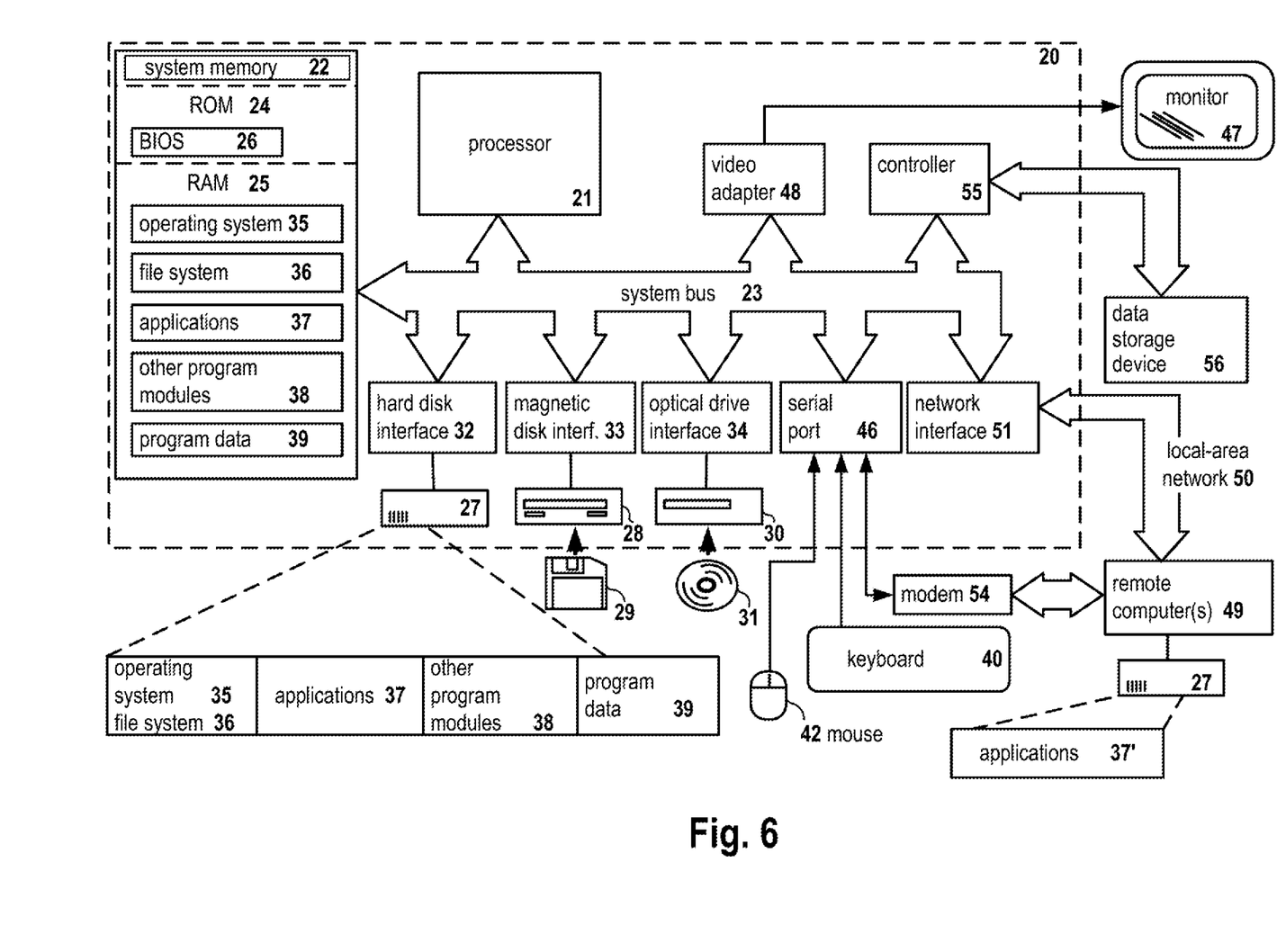
FIG. 6 is a block diagram of a computer system on which the disclosed system and method can be implemented according to an exemplary aspect.

FIG. 6 is a block diagram of a computer system 20 on which aspects of systems and methods for executing a blockchain-based transaction may be implemented in accordance with an exemplary aspect. It should be noted that the computer system 20 can correspond to the user device 102, server systems 101, server system 121, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for recovering a cryptocurrency wallet, comprising:
   receiving, by a first computing device associated with a cryptocurrency service provider, a request to recover, without a user key of a user, cryptographic assets attributed to a multi-signature wallet, wherein the multi-signature wallet is associated with a set of encryption keys for signing transactions comprising the user key of the user, a provider private key of the cryptocurrency service provider, and a reserve private key of a key escrow organization;
   generating a blockchain transaction data structure for the multi-signature wallet, wherein the blockchain transaction data structure includes a script configured, when executed by a node in a blockchain network, to replace the user key with a replacement user key for the user;
   generating a first digital signature based on the blockchain transaction data structure using the provider private key, wherein the provider private key is stored at the first computing device;
   receiving, from a second computing device associated with the key escrow organization, a second digital signature generated based on the blockchain transaction data structure using the reserve private key, wherein the reserve private key is stored at the second computing device; and
   transmitting the blockchain transaction data structure that includes the first digital signature and the second digital signature to the blockchain network for validation.

2. The method of claim 1, further comprising:
   responsive to receiving the request to recover the cryptographic assets attributed to the multi-signature wallet, authenticating a user using a multi-factor authentication technique.

3. The method of claim 1, wherein the multi-signature wallet is configured using an M-of-N scheme, wherein actions related to the multi-signature wallet are authorized using at least two of: the provider private key, the reserve private key, and the user private key.

4. The method of claim 1, further comprising:
receiving, from a user device operated by the user, a replacement public key to be associated with the multi-signature wallet; and
modifying the blockchain transaction data structure to include at least one of a copy of the replacement public key, and a value derived from the replacement public key.

5. The method of claim 1, wherein the script of the blockchain data structure comprises executable code configured to:
verify the blockchain transaction data structure has been signed by at least the provider private key and the reserve private key;
responsive to verifying the blockchain transaction data structure has been signed, remove an association of the user key with the multi-signature wallet and add an association of the replacement key with the multi-signature wallet.

6. The method of claim 1, further comprises:
transmitting, to a user device, a one-time password in response to the recovery request, wherein the one-time password is transmitted by the first computing device as a text message via a short message service (SMS).

7. A system for recovering a cryptocurrency wallet, comprising:
a memory device configured to store a provider private key; and
a hardware processor configured to:
receive a request to recover, without a user key of a user, cryptographic assets attributed to a multi-signature wallet, wherein the multi-signature wallet is associated with a set of encryption keys for signing transactions comprising the user key of the user, a provider private key of the cryptocurrency service provider, and a reserve private key of a key escrow organization;
generate a blockchain transaction data structure for the multi-signature wallet, wherein the blockchain transaction data structure includes a script configured, when executed by a node in a blockchain network, to replace the user key with a replacement user key for the user;
generate a first digital signature based on the blockchain transaction data structure using the provider private key associated with the multi-signature wallet;
receive, from a second computing device associated with the key escrow organization, a second digital signature generated based on the blockchain transaction data structure using a reserve private key, wherein the reserve private key is stored at the second computing device; and
transmit the blockchain transaction data structure that includes the first digital signature and the second digital signature to the blockchain network for validation.

8. The system of claim 7, wherein the processor is further configured to:
responsive to receiving the request to recover the cryptographic assets attributed to the multi-signature wallet, authenticate a user using a multi-factor authentication technique.

9. The system of claim 7, wherein the multi-signature wallet is configured using an M-of-N scheme, wherein actions related to the multi-signature wallet are authorized using at least two of: the provider private key, the reserve private key, and the user private key.

10. The system of claim 7, wherein the processor is further configured to:
receive, from a user device operated by the user, a replacement public key to be associated with the multi-signature wallet;
modify the blockchain transaction data structure to include at least one of a copy of the replacement public key, and a value derived from the replacement public key.

11. The system of claim 7, wherein the script of the blockchain data structure comprises executable code configured to:
verify the blockchain transaction data structure has been signed by at least the provider private key and the reserve private key;
responsive to verifying the blockchain transaction data structure has been signed, remove an association of the user key with the multi-signature wallet and add an association of the replacement key with the multi-signature wallet.

12. The system of claim 7, wherein the processor is further configured to:
transmit, to a user device, a one-time password in response to the recovery request, wherein the one-time password is transmitted as a text message via a short message service (SMS).

13. A non-transitory computer readable medium comprising computer executable instructions for recovering a cryptocurrency wallet, including instructions for:
receiving, by a first computing device associated with a cryptocurrency service provider, a request to recover, without a user key of a user, cryptographic assets attributed to a multi-signature wallet, wherein the multi-signature wallet is associated with a set of encryption keys for signing transactions comprising the user key of the user, a provider private key of the cryptocurrency service provider, and a reserve private key of a key escrow organization;
generating a blockchain transaction data structure for the multi-signature wallet, wherein the blockchain transaction data structure includes a script configured, when executed by a node in a blockchain network, to replace the user key with a replacement user key for the user;
generating a first digital signature based on the blockchain transaction data structure using the provider private key, wherein the provider private key is stored at the first computing device;
receiving, from a second computing device associated with the key escrow organization, a second digital signature generated based on the blockchain transaction data structure using the reserve private key, wherein the reserve private key is stored at the second computing device; and
transmitting the blockchain transaction data structure that includes the first digital signature and the second digital signature to the blockchain network for validation.

14. The non-transitory computer readable medium of claim 13, further comprising instructions for:

responsive to receiving the request to recover the cryptographic assets attributed to the multi-signature wallet, authenticating a user using a multi-factor authentication technique.

15. The non-transitory computer readable medium of claim 13, wherein the multi-signature wallet is configured using an M-of-N scheme, wherein actions related to the multi-signature wallet are authorized using at least two of: the provider private key, the reserve private key, and the user private key.

16. The non-transitory computer readable medium of claim 13, further comprising instructions for:
receiving, from a user device operated by the user, a replacement public key to be associated with the multi-signature wallet; and
modifying the blockchain transaction data structure to include at least one of a copy of the replacement public key, and a value derived from the replacement public key.

17. The non-transitory computer readable medium of claim 13, wherein the script of the blockchain data structure comprises executable code configured to:
verify the blockchain transaction data structure has been signed by at least the provider private key and the reserve private key;
responsive to verifying the blockchain transaction data structure has been signed, remove an association of the user key with the multi-signature wallet and add an association of the replacement key with the multi-signature wallet.

18. The non-transitory computer readable medium of claim 13, further comprises instructions for:
transmitting, to a user device, a one-time password in response to the recovery request, wherein the one-time password is transmitted by the first computing device as a text message via a short message service (SMS).

* * * * *